United States Patent [19]

Kinczel et al.

[11] Patent Number: 5,004,948
[45] Date of Patent: Apr. 2, 1991

[54] LUMINESCENT MATERIAL, ESPECIALLY FOR APPLICATION IN MERCURY VAPOR GAS DISCHARGE LIGHT SOURCES, AND MERCURY VAPOR GAS DISCHARGE LIGHT SOURCE

[75] Inventors: Péter Kinczel; László Balázs; Gábor Sajó, all of Budapest, Hungary

[73] Assignee: Tungsram Reszvenytarsasag (Tungsram RT), Budapest, Hungary

[21] Appl. No.: 327,326

[22] Filed: Mar. 22, 1989

[30] Foreign Application Priority Data

Mar. 28, 1988 [HU] Hungary .............................. 1532/88

[51] Int. Cl.$^5$ ............................................ H01J 63/04
[52] U.S. Cl. .................................... 313/486; 313/487; 313/635; 252/301.4 R
[58] Field of Search ................. 313/486, 487, 635; 252/301.4 R

[56] References Cited

U.S. PATENT DOCUMENTS

| | | |
|---|---|---|
| 2,748,303 | 5/1956 | Thorington .................... 313/487 X |
| 3,569,762 | 3/1971 | Levine et al. ................ 252/301.4 R |
| 4,034,257 | 7/1977 | Hoffman ............................ 313/487 |
| 4,241,276 | 12/1980 | Wyner et al. ...................... 313/487 |
| 4,431,942 | 2/1984 | Thornton ........................... 313/487 |
| 4,727,283 | 2/1988 | Kemenade et al. ................ 313/487 |

FOREIGN PATENT DOCUMENTS 8502025  7/1985  Netherlands .

OTHER PUBLICATIONS

Journal of El. Chem. Soc. article (Feb. 1973) pp. 278-281, Solid-State Science and Technology.

*Primary Examiner*—Donald J. Yusko
*Assistant Examiner*—Michael Horabik
*Attorney, Agent, or Firm*—Kane, Dalsimer, Sullivan, Kurucz, Levy, Eisele and Richard

[57] ABSTRACT

In a luminescent material which comprises a first component for luminescing red light under influence of incident optical radiation and a second component for luminescing in the spectral range from 520 to 560 nm, the second component includes a first phase of garnet crystallization system consisted of yttrium aluminate activated by trivalent cerium and determined by the general structural formula $Y_{3-a}Ce_aAl_5O_{12}$, wherein $0.0003 < a < 0.1$, and a second phase of hexagonal crystallization system of general structural formula $La_b Ce_{1-b}Al_{11}O_{18}$, wherein $0 < b < 1$, and the second phase is present in an amount ranging from the amounts detectable by means of X-ray diffractometry to the double amount of the first phase. In a low-pressure or high-pressure mercury vapor gas discharge lamp, comprising a hermetically sealed discharge vessel including at least two electrodes for generating a gas discharge process, an inner surface is covered by a luminescent material, comprising the two phases mentioned above, wherein the composition of the two phases is determined by the general structural formula $Y_{3-a}Ce_aAl_5O_{12} + xLa_b Ce_{1-b}Al_{11}O_{18}$, wherein $0 < x < 2$, $0.0003 < a < 0.1$ and $0 < b < 1$ and the second phase is present in an amount ranging from the amounts detectable by means of X-ray diffractometry to the double amount of the first phase.

14 Claims, 4 Drawing Sheets

LUMINESCENT MATERIAL, ESPECIALLY FOR APPLICATION IN MERCURY VAPOR GAS DISCHARGE LIGHT SOURCES, AND MERCURY VAPOR GAS DISCHARGE LIGHT SOURCE

FIELD OF THE INVENTION

The present invention refers to a luminescent material, especially for application in mercury vapor gas discharge light sources, which comprises a first component for luminescing red light under influence of incident optical radiation and a second component for luminescing under influence of the incident optical radiation in the spectral range from 520 to 560 nm including colors from green to yellow, wherein the second component includes yttrium aluminate activated by trivalent cerium. It refers also to a low-pressure and a high-pressure mercury vapor gas discharge light source realised on the basis of the proposed luminescent material.

BACKGROUND OF THE INVENTION

The majority of the gas discharge light sources of known design and especially the gas discharge lamps comprising mercury as a metal additive have been applied since relatively long time and they can be used especially for lighting purposes on open areas, e.g. on roads, squares etc. In the gas discharge light sources realised with a gas discharge process generated in vaporised mercury the most important source of the optical radiation is the gas discharge arc existing even in a mercury vapor environment. The disadvantage of these lamps is that the optical spectrum of the radiation emitted by the gas discharge arc generated in a mercury vapor system comprises basically only two spectral ranges, i.e. the range from the yellow to the green (the wavelength range from 546 to 577–79 nm) and the range from the blue to violet (the wavelength range 440 to 404, 407 nm). This radiation spectrum is shown in FIG. 1 taken from a gas discharge arc generated in a mercury vapor system.

The color rendition of the light sources radiating the only light generated by a discharge arc in a mercury vapor system is not satisfactory. It can be improved by applying an appropriate luminescent material coating a surface directed to the gas discharge space. In this way a special optical transformation is carried out: the luminescent material absorbs a part of the incident optical radiation generated by the discharge arc and especially absorbs from the ultraviolet part thereof and by luminescing in a selected spectral range, especially in the range of the red color it improves the color rendition by adding a part of required color to the emitted optical radiation.

The luminescent material is adopted generally on an inner surface of an envelope including a space determined by electrodes for generating the gas discharge arc, the space being filled with mercury as a metal additive and a rare gas. The high-pressure mercury vapor gas discharge lamps are equipped with an outer envelope bearing the layer of the luminescent material and including a closed discharge vessel comprising the electrodes and the filling (the metal additive and the rare gas). In the low-pressure mercury vapor gas discharge lamps the outer envelope generally lacks and the gas discharge vessel itself is coated on its inner surface with the luminescent material. The voltage supply of the last is ensured by means arranged in the end parts of the discharge vessel; in the high-pressure mercury vapor gas discharge lamps the outer envelope is completed by a normal standardised socket, e.g. of Edison-type according to the well known solutions accepted by the general practice.

The background art refers to several chemical compositions and blends thereof to be taken into account when preparing luminescent materials for improving the optical radiation spectrum of a gas discharge light source and especially those operating with mercury vapor. The U.S. Pat. No. 2 748 303 discloses a high-pressure mercury vapor gas discharge lamp with luminescent material consisting of magnesium fluorogermanate activated by manganese. The translucent envelope of the lamp is covered by a layer of this luminescent material. It has the disadvantage of the germanates: they are not always as stabilized as required. The U.S. Pat. No. 3,569,762 issued to Levin et al offers a solution of this problem: the luminescent material proposed consists of yttrium vanadate and/or yttrium vanadate phosphate, both activated by trivalent europium. The optical spectrum in the visible range of the light emitted by a high-pressure mercury vapor gas discharge lamp realised with the luminescent material consisted of yttrium vandate activated by trivalent europium-Eu(III)-is illustrated in FIG. 2.

Lots of attempts have been noticed for ensuring a further improvement of the color parameters of the light emitted by a mercury vapor gas discharge lamp:

(1) In the fluorescent lamps of well-known different designs (i.e. in the low-pressure mercury vapor gas discharge tubes) a blend of luminescent materials emitting in three color ranges is generally applied. The color regions of the radiation are: blue, green and red. This solution can be taken over also to the high-pressure mercury vapor lamps as it is comprised in the U.S. Pat. No. 4,431,942. According to the last the blend applied in the correction layer, i.e. in the layer of the luminescent material covering an inner surface of a high-pressure mercury vapor gas discharge lamp should include: strontium chloroapatite or barium magnesium aluminate, each activated by bivalent europium, for radiating in the spectral range from 440 nm to 470 nm (from violet to blue), zinc sulphide activated by bivalent copper or calcium sulphide activated by trivalent cerium or calcium magnesium aluminate activated by trivalent cerium and trivalent terbium, for radiating in the spectral range from 520 nm to 560 nm (from green to yellow) and yttrium vanadate or yttrium vanadate phosphate, both activated by trivalent europium, for radiating in the spectral range from 605 nm to 630 nm. According to the description the light source of this kind can be regulated to have color temperature in the value range from 2700K to 2900K. The practice hasn't accepted this blend as luminescent material.

(2) A two component blend is applied for covering the outer envelope of the high-pressure mercury vapor gas discharge lamps. The first component is the yttrium vanadate or yttrium vanadate phosphate proposed by Levin et al. in the U.S. Pat. No. 3,569,762 and the second consists of an yttrium aluminate of garnet crystallization system (the garnets are mixed oxides forming holohedral crystals of cubic lattice). Yttrium aluminate absorbs the optical radiation of 435 nm wavelength produced by the gas discharge arc in the environment of the mercury vapor transforming it into the spectral range below and in the proximity of 560 nm, ensuring radiation in the yellow-green color region. This solution is shown in the U.S. Pat. No. 4,034,257 to M. Hoffman and U.S. Pat. No. 4,241,276 to Wyner et al. M. Hoffman discloses the luminescent material emitting the red light, i.e. the above mentioned yttrium-vanadate and/or yttrium vanadate phosphate activated by trivalent europium and the yttrium aluminate of garnet crystal structure has to constitute about 5 to 30% of the mass of the resulting luminescent material. The composition of this additive material of garnet crystal structure can be determined by the general structural formula

wherein the value of the index x lies in the expedient range $0.004 < x < 0.02$.

Wyner et al in the U.S. Pat. No. 4,241,276 disclose that the second component should constitute about 35 to 40% of the mass of the resulting luminescent material. This amount has to be preferred in order to improve the lm/W efficiency of the gas discharge lamps. The visible part of the spectrum of a high-pressure mercury vapor gas discharge light source realised with a luminescent material layer of Wyner et al is illustrated in FIG. 3.

The luminescent material with yttrium aluminate garnet activated by trivalent cerium added in the amounts defined by the background art has double object. The first of them is to absorb the 435 nm (blue) part of the radiation emitted by the discharge arc and thereby to shift the color point of the light source in the direction of the lower color temperatures in the line of the black body radiation resulting in improved color rendition of the lamp, too, and the second of them is to be excited under influence of the incident optical radiation and to emit radiation with wavelength about 560 nm. This is an advantegeous transformation of the incident optical energy. The blue color radiation in the spectral range of 435 nm is absorbed by the cerium(III) atoms present in the crystal lattice of the garnets, forming the trivalent components thereof. The absorption process shows intensity proportional to the amount of the cerium(III) atoms at the beginning. The lower limit can be determined only on the basis that a definite cerium(III) amount is necessary to ensure efficiency as low as detectable. The amount of the cerium(III) ions can not be, however, endlessly increased, i.e. there exists an upper limit whereover the cerium(III) ions can not be the part of the crystal lattice, it is no space for them therein: the excess of the cerium(III) ions constitutes a separate phase. The lower limit of the amount where this separate phase can be detected, can be identified with the upper limit of the acceptable amounts of cerium(III) in the lattice. In the Journal of El. Chem. Soc. (1973, 69, p. 278) it can be found that the excess cerium-(III) ions form in the mentioned conditions an aluminate phase ($CeAlO_3$). This phase deteriorates the optical features of the luminescent material, also when it is present in very low amounts. The same refers to the lanthanum(III) ions which can be accepted by the garnet structure lattice of the yttrium aluminate with similar difficulties—they can replace about 1% of the cerium(III) atoms according to Hoffman and Wyner.

The Hungarian patent specification No. 194 649 (corresponding to the NL application No. 85′02025 of 15th July 1985 filed in the name of N. V. Philips Gloeilampenfabrieken, Eindhoven, Holland) discloses that in the low-pressure mercury vapor gas discharge lamps the concentration of the Ce(III) ions may not be higher than 0.15 mol for 1 mol of the garnet because the higher concentration results in forming separate undesired phases.

SUMMARY OF THE INVENTION

The invention is directed to realising a luminescent material of improved optical features.

The invention is based on the recognition that the excess amounts of the aluminium in a rare earth metal aluminate system—when compared to the stochiometric relationships—can be very advantageous, i.e. a blend is to be formed as a component of the luminescent material, the blend being determined by the general structural formula

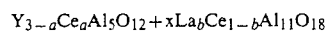

wherein the coefficient x and the indices a and b may be characterized by the value ranges:

$0 < x < 2$, $0.0003 < a < 0.1$, $0 < b < 1$.

The advantage of the blend (component) mentioned above is that neither the $LaAlO_3$ nor the $CeAlO_3$ phase can be detected. Likely this follows from the fact that according to the X-ray diffractometric analysis the luminescent material is partly of garnet crystallization system—determined on the basis of ASTM PDF card No. 8-178—and partly of hexagonal crystallization system, wherein both parts are formed by aluminates. The hexagonal part can be determined by the X-ray diffractometry (ASTM PDF card No. 33-699). According to the investigations the hexagonal part should constitute from 5 to 70% of the mass of the resulting luminescent material.

The essence of the recognition is that the luminescent material, especially when applied for mercury vapor gas discharge light sources should include a first component for radiating in red light, especially the mentioned yttrium vanadate or yttrium vanadate phosphate activated by trivalent europium and a second component absorbing the blue spectral range and radiating in the yellow-green range, wherein the second component is a rare earth metal aluminate system activated by trivalent cerium, consisting of a part of garnet crystallization system and a hexagonal crystal part, the second component being prepared from a raw blend including aluminium excess. The luminescent material made on the basis of a such raw blend guarantees the advantageous parameters of the known luminescent blends and offers a general improvement of the UV efficiency.

The object of the present invention is therefore to create a luminescent material with novel composition, showing a mixed crystal structure with improved UV efficiency, further to elaborate different kinds of the mercury vapor gas discharge light sources, i.e. low-pressure and high-pressure gas discharge lamps with improved UV efficiency.

In order to improve the efficiency of transforming the ultraviolet energy of an optical radiation a luminescent material has been created, especially for application in mercury vapor gas discharge light sources, which comprises a first component for luminescing red light under influence of an incident optical radiation and a second component for luminescing under influence of the incident optical radiation in the spectral range from 520 to 560 nm including colors from green to yellow, the second component including a first phase of garnet crystallization system consisted of yttrium aluminate activated by trivalent cerium and determined by the general structural formula $Y_{3-a}Ce_aAl_5O_{12}$ wherein the value of the index a lies in the range from 0.0003 to 0.1, expediently from 0.003 to 0.1, and a second phase of hexagonal crystallization system consisted of a mixed rare earth aluminate of general structural formula $La_bCe_{1-b}Al_{11}O_{18}$, wherein the value of the index b lies in the range $0<b<1$, expediently $0.1<b<1$, and the second phase is present in an amount ranging from the amounts detectable by means of X-ray diffractometry to the double amount of the first phase, and expediently it doesn't exceed the amount of the first phase.

It may be also advantageous if in the first phase at most 1% of the cerium atoms were substituted by lanthanum atoms.

In an especially preferred embodiment of the proposed luminescent material the first component is either yttrium vanadate or yttrium vanadate phosphate, both being activated by trivalent europium, wherein the second component is determined by the general structural formula $Y_{3-a}Ce_aAl_5O_{12}+xLa_bCe_{1-b}Al_{11}O_{18}$, wherein the coefficient x lies in the range $0<x<2$, expediently $0<x<1$.

On the basis of the luminescent material proposed by the invention the lighting parameters of the mercury vapor gas discharge lamps can be improved. Therefore it is an object of the present invention to realise a low-pressure mercury vapor gas discharge lamp, consisting of a hermetically sealed discharge vessel including at least two electrodes for generating a gas discharge process therebetween in a filling introduced into the inner space of the discharge vessel, the filling comprising mercury as a metal additive and a rare gas, the discharge vessel being equipped with means for connecting the electrodes to an outer voltage supply and covered on the inner surface with a luminescent material. It is also a further object of the present invention to realise a high-pressure mercury vapor gas discharge lamp differing in construction from the low-pressure embodiment by applying an outer envelope for receiving the luminescent material on its inner surface and differing also in the fact that the connecting means are arranged in a socket arranged in a distance from the discharge vessel but supporting it; the outer envelope is also hermetically sealed and vacuum is ensured in the inner space or an appropriate inert gas is applied for filling this inner space. In both of the low-pressure and high-pressure mercury vapor gas discharge lamps the luminescent material comprises a first component for luminescing red light under influence of an incident optical radiation and a second component for luminescing under influence of the incident optical radiation in the spectral range from 520 to 560 nm including colors from green to yellow, the second component including a first phase of garnet crystallization system consisted of yttrium aluminate activated by trivalent cerium and determined by the general structural formula $$Y_{3-a}Ce_aAl_5O_{12}$$

wherein the value of the index a lies in the range $0.0003<a<0.1$, expediently $0.003<a<0.1$, and a second phase of hexagonal crystallization system consisted of a mixed rare earth aluminate of general structural formula $$La_bCe_{1-b}Al_{11}O_{18}$$

wherein the value of the index b lies in the range $0<b<1$, expediently $0.1<b<1$, and the second phase is present in an amount ranging from the amounts detectable by means of X-ray diffractometry to the double amount, expediently not exceeding the amount of the first phase.

It is especially advantageous in the high-pressure mercury vapor gas discharge lamps, when the first component is either yttrium vanadate or yttrium vanadate phosphate, both being activated by trivalent europium, and the second component being a two phase blend only consists of the the first and second phases defined above, the second component being determined by the general structural formula $$Y_{3-a}Ce_aAl_5O_{12}+xLa_bCe_{1-b}Al_{11}O_{18}$$

wherein the coefficient x lies in the range $0<x<2$, or expediently in the range $0<x<1$.

It is also very advantageous that the required improved parameters can be obtained also in the case, when in the first phase at most 1% of the cerium(III) atoms is substituted by lanthanum(III) atoms.

The basic advantage of the luminescent material proposed by the invention is the unexpected high improvement of the UV efficiency when compared to the known luminescent materials including the yttrium aluminated activated by trivalent cerium and crystallized in garnet system. The same advantage can be stated in the mercury vapor gas discharge lamps realised with a layer of luminescent material including the proposed blend.

The luminescent material as proposed for application in the high-pressure mercury vapor gas discharge lamps may preferebly contain 5 to 30%—related to the whole mass—the blend as defined above.

BRIEF DESCRIPTION OF THE DRAWINGS

The invention will be described in more detail by way of example and with reference to preferred embodiments of the luminescent material proposed. Reference will be made also to the attached drawings, wherein FIG. 1 referred to above shows the spectrum of radiation emitted by a gas discharge process in mercury vapor without correction, FIG. 2 referred to above illustrates the spectrum of optical radiation emitted by a gas discharge process in mercury vapor with correction by a luminescent material consisting of $YVO_4:Eu^{3+}$, the spectrum taken from a high-pressure gas discharge lamp, FIG. 3 referred to above illustrates the spectrum of optical radiation emitted by a high-pressure mercury vapor gas discharge lamp prepared with a two component luminescent material proposed by Wyner et al in the U.S. Pat. No. 4,241,276.

DESCRIPTION OF THE PREFERRED EMBODIMENTS

The luminescent material proposed by the invention comprises always a two phase blend prepared with aluminates of garnet and hexagonal crystallization systems.

In the first step of preparing the blend a raw mixture should be composed from the mentioned aluminates in amounts following from the general structural formula:

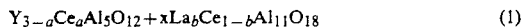

$$Y_{3-a}Ce_aAl_5O_{12} + xLa_bCe_{1-b}Al_{11}O_{18} \quad (1)$$

wherein the first member, i.e. $Y_{3-a}Ce_aAl_5O_{12}$ means the first phase of garnet crystallization system (this is yttrium aluminate activated by trivalent cerium) and the second member, i.e. $La_bCe_{1-b}Al_{11}O_{18}$ is the second phase of hexagonal crystallization system. The coefficient x and the indices a and b are characterized by the following value ranges:

$0 < x < 2$, expediently $0 < x < 1$,
$0.0003 < a < 0.1$, expediently $0.003 < a < 0.1$,
$0 < b < 1$, expediently $0.1 < b < 1$.

For composing the raw mixture the basic components are selected generally from the group of the oxides or substances which are transformable by heating into oxides. A fluxing agent can be added, too, if required. The fluxing agent is advantageously the boric acid, applied in the amounts as high as usual in the production of the luminescent materials.

The completed raw mixture is ground to a desired fineness and fired in an environment of slight reducing activity having temperature not lower than 1200° C. The fired mixture is crushed, if necessary, then sieved and the fraction of required graininess can be used for preparing the luminescent coating of a gas discharge light source, especially a high- or low-pressure mercury vapor gas discharge lamp. The process of making this coating can be characterized by known steps and it doesn't form a part of the present invention.

Figure 1:
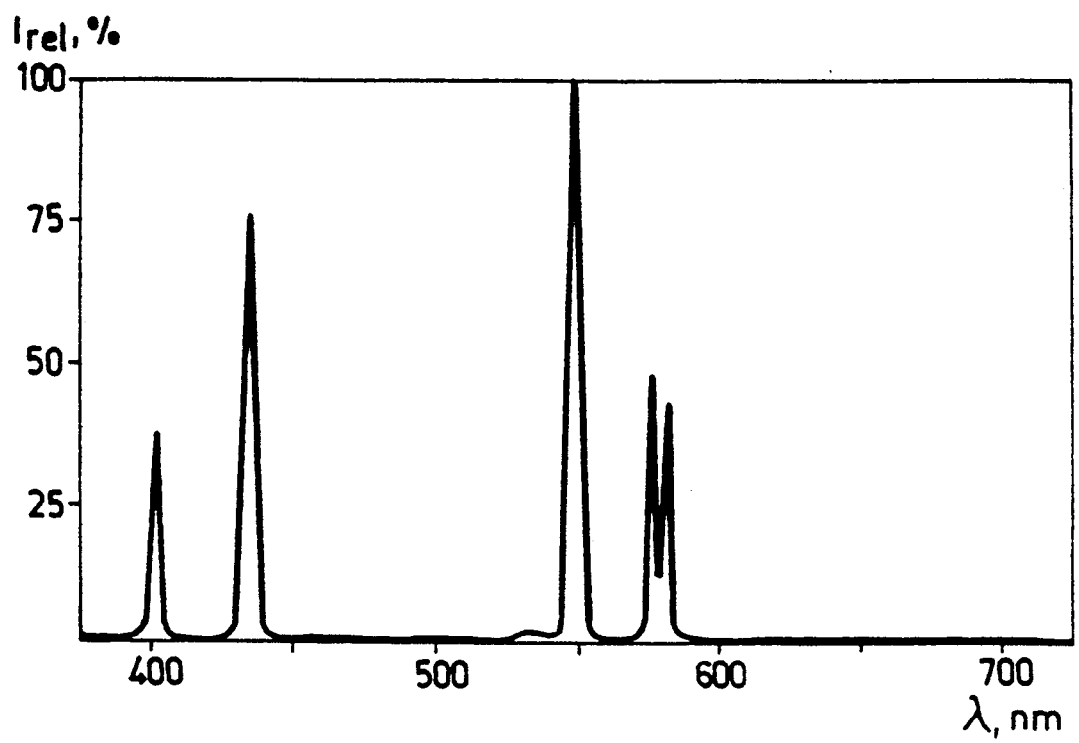
Figure 2:
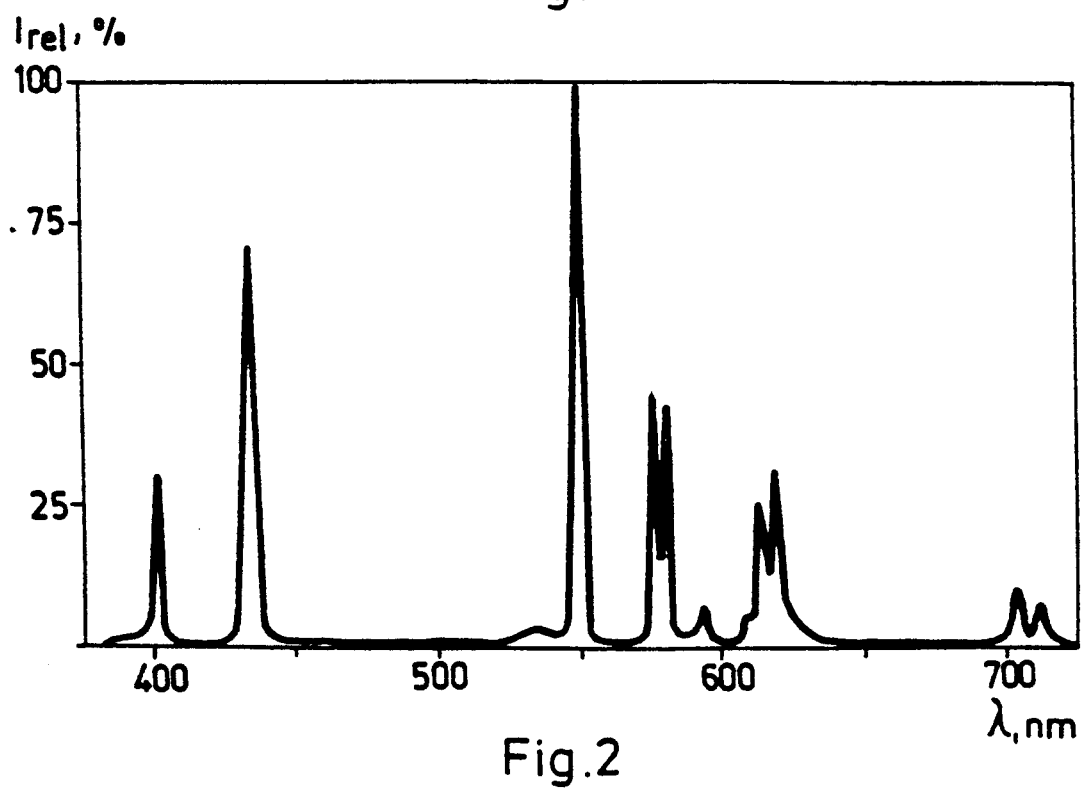
Figure 3:
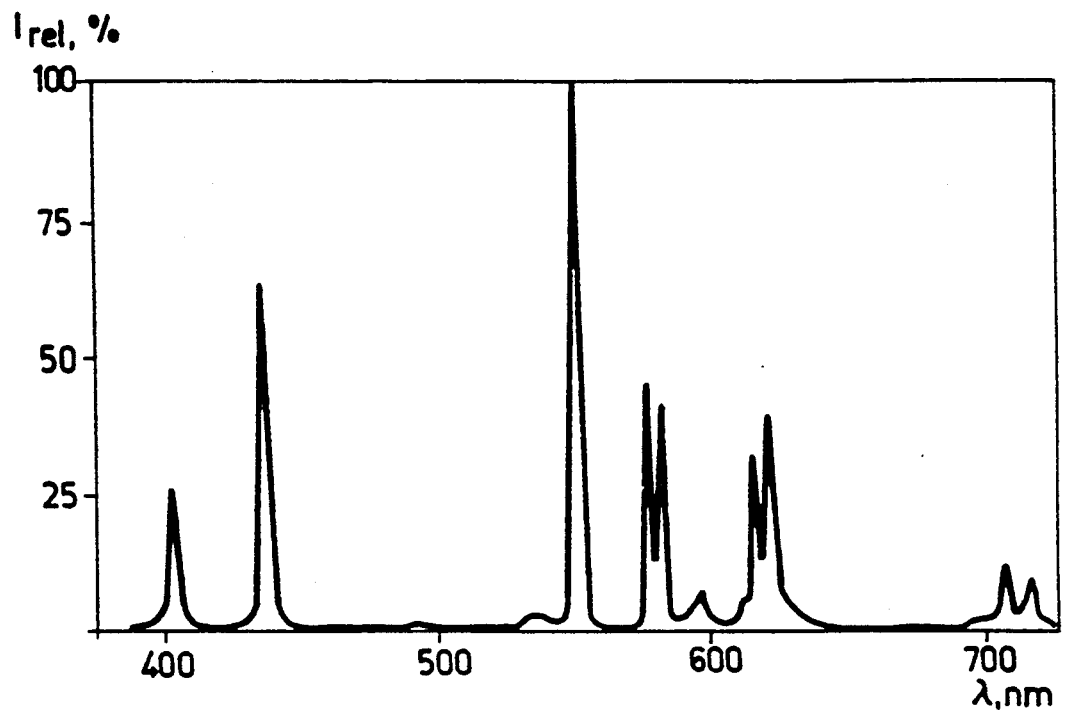
Figure 4:
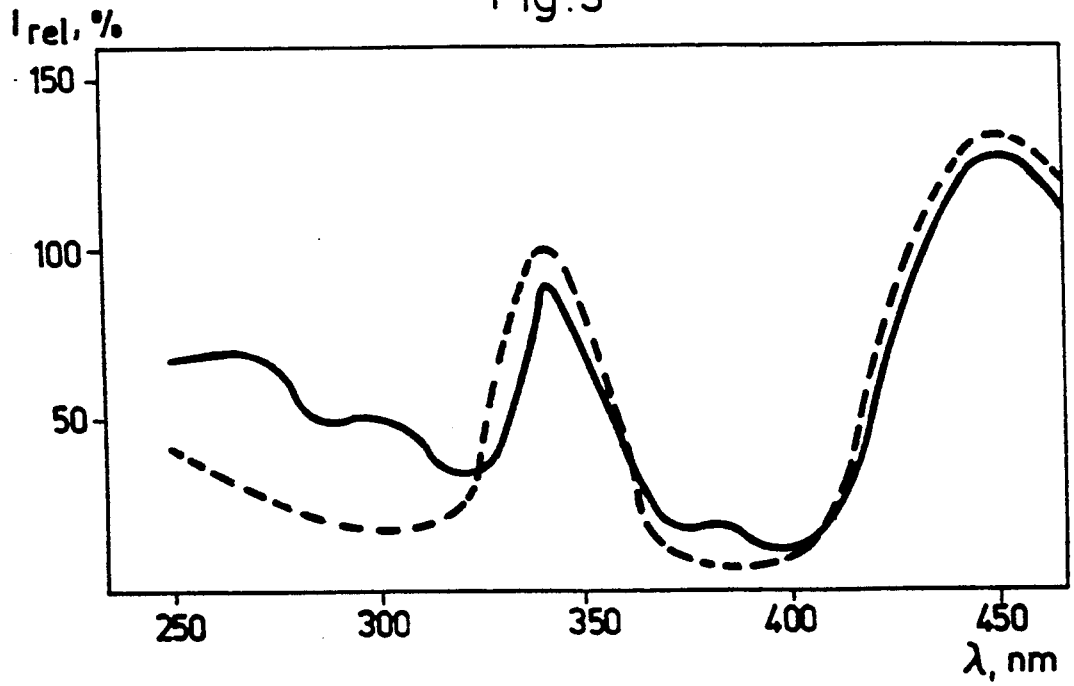
FIG. 4 represents a comparison of the excitation spectra of a one phase aluminate garnet system of known composition (- - -) and a two phase aluminate of mixed crystal system proposed by the present invention (—) and FIG. 5 shows an isometric partial cross sectional view of a high-pressure mercury vapor gas discharge light source.

The blend obtained by processing the substances mentioned above shows better UV performance parameters than the known luminescent materials, when applied to a gas discharge process generated in mercury vapor. This is represented by FIG. 4, wherein the lines are assigned to the relative intensity of the luminescent material versus wavelength λ expressed in nm: the dotted line here refers to the known luminescent material systems including yttrium aluminate garnet and the continuous line to the luminescent material of the invention, i.e. including also a hexagonal phase.

In a high-pressure mercury vapor gas discharge lamp (FIG. 5) an outer envelope 1 is applied for determining an inner space comprising a hermetically sealed discharge vessel. The discharge vessel is filled with a metal additive and a rare gas, wherein the metal additive is generally mercury or a mercury containing substance. The outer envelope 1 is air-tight sealed and it is equipped with at least two electrodes 3, 4 for generating a gas discharge system therebetween, and a socket of known construction including the means 6 for supplying electric current from an outer voltage supply to the electrodes 3,4. The outer envelope 1 is covered on its inner surface by a luminescent coating 2 having surface density in the range 250 to 300 mg/cm². The luminescent coating 2 generally consists of one or two layers. In the first layer covering directly the glass surface of the outer envelope 1 there is a mixture of the two phase blend defined above—i.e. comprising a first phase with the aluminate of garnet cyrstallization system and a second phase with the aluminate of hexagonal crystallization system—with either the yttrium vanadate activated by trivalent europium or the yttrium vanadate phosphate actived also by trivalent europium. If a second layer is necessary, this is created by the mentioned yttrium vanadate or yttrium vanadate phosphate only. The luminescent coating 2 can be prepared by any known method, especially the electrostatic methods are preferred.

Figure 5:
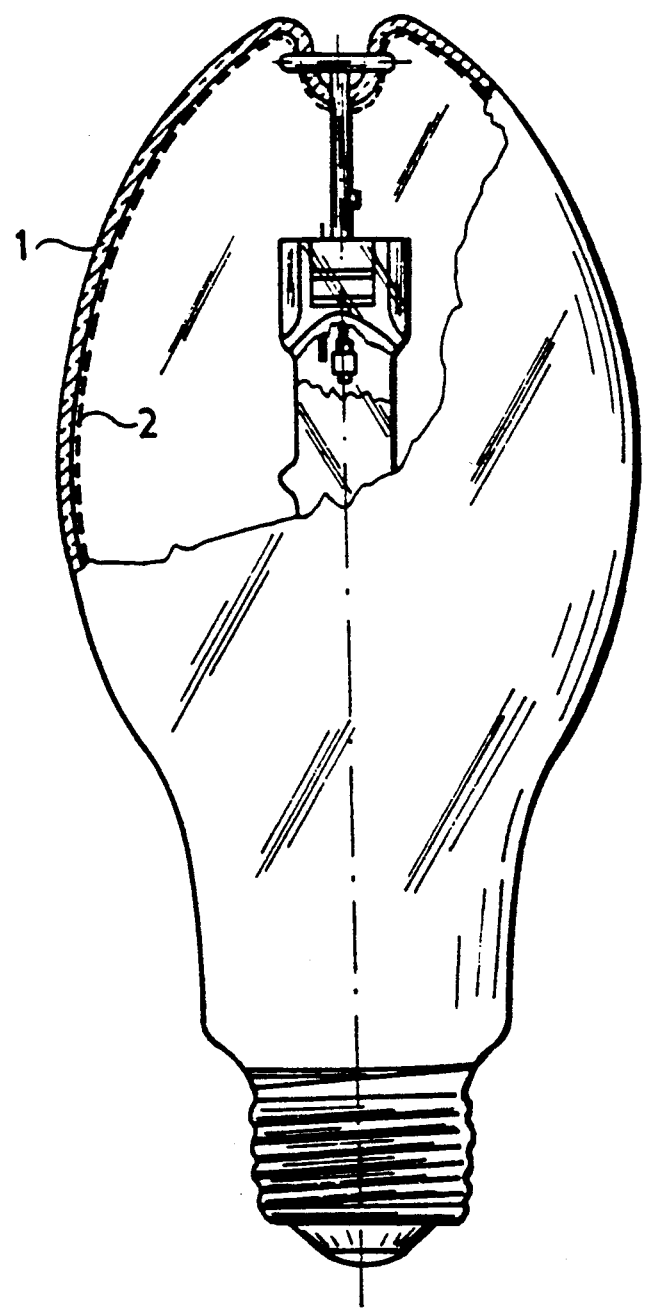

After preparing the luminescent coating 2 the high-pressure mercury vapor gas discharge lamp realized according to FIG. 5 was investigated in order to determine the most important parameters. The color temperature values lie in the range 3100 to 3400K, the color rendition index ($R_1$) in the range 50 to 57, the light efficiency in the range 52 to 58 lm/W depending on the power of the light source. The advantegoues values of the color temperature and the high color rendition index are characteristic also for the light sources based on one phase aluminium garnet systems. The two phase blend proposed improves the light efficiency parameters without deteriorating the favorable color temperature and color rendition indices.

The following comparison (TABLE) shows that the high-pressure mercury vapor gas discharge lamp realized with the luminescent material blend as proposed by the present invention ensures improvement in the value of the relative light flux emitted by the lamp when compared to the high-pressure mercury vapor gas discharge lamps with outer envelope, having a luminescent coating 2 consisting of only the yttrium aluminate of garnet crystal structure, the coating realized according to the prior art.

TABLE

| Luminescent material | Relative light flux, $I_{rel}$, % |
| --- | --- |
| having composition as proposed by the invention | 104 |
| consisting of a known substance of garnet system (of Sylvania 251 type) | 100 |

The luminescent material having composition as proposed by the present invention will be futher explained on the basis of examples of its two phase component without limiting the scope of protection desired to be determined by the attached claims.

EXAMPLE 1

The following substances in the amounts given below were introduced into a porcelain ball mill:

| | |
| --- | --- |
| 16.5 g | $Y_2O_3$ |
| 0.815 g | $La_2O_3$ |
| 0.861 g | $CeO_2$ |
| 16.3 g | $Al_2O_3$ |
| 0.345 g | $H_3BO_3$ |

The amounts given above determine the following values of the coefficient x and indices a and b in the general structural formula (1): $x = 0.125$, $a = 0.075$ and $b = 0.1$.

The components as defined above were mixed, then ground for one hour and introduced into a furnace for firing. The firing process lasted two hours in temperature 1480° C. and was carried out in a $N_2$ atmosphere containing 3 vol. % $H_2$.

The mixture after firing out was crushed and then sieved. A blend of the required graininess having the composition as disclosed above was applied for realizing a mercury vapor gas discharge light source, The material obtained in this way was subjected to an X-ray diffractometric structural analysis demonstrating that the volume rate occupied by the hexagonal phase was 13%.

EXAMPLE 2

The following substances in the amounts given below were introduced into a porcelain ball mill:

| | |
|---|---|
| 16.5 g | $Y_2O_3$ |
| 1.63 g | $La_2O_3$ |
| 1.08 g | $CeO_2$ |
| 19.8 g | $Al_2O_3$ |
| 0.390 g | $H_3BO_3$ |

The amounts given above determine the following values of the coefficient x and indices a and b in the general structural formula (1): $x=0.250$, $a=0.075$ and $b=0.2$.

The luminescent material was prepared according to the steps disclosed in connection with Example 1.

The material obtained in this way was subjected to an X-ray diffractometric structural analysis demonstrating that the volume rate occupied by the hexagonal phase was 24%.

EXAMPLE 3

The following substances in the amounts given below were introduced into a porcelain ball mill:

| | |
|---|---|
| 16.5 g | $Y_2O_3$ |
| 2.44 g | $La_2O_3$ |
| 1.29 g | $CeO_2$ |
| 23.3 g | $Al_2O_3$ |
| 0.435 g | $H_3BO_3$ |

The amounts given above determine the following values of the coefficient x and indices a and b in the general structural formula (1): $x=0.375$, $a=0.075$ and $b=0.3$.

The luminescent material was prepared according to the steps disclosed in connection with Example 1.

The material obtained in this way was subjected to an X-ray diffractometric structural analysis demonstrating that the volume rate occupied by the hexagonal phase was 31%.

EXAMPLE 4

The following substances in the amounts given below were introduced into a porcelain ball mill:

| | |
|---|---|
| 16.5 g | $Y_2O_3$ |
| 3.26 g | $La_2O_3$ |
| 1.51 g | $CeO_2$ |
| 26.8 g | $Al_2O_3$ |
| 0.481 g | $H_3BO_3$ |

The amounts given above determine the following values of the coefficient x and indices a and b in the general structural formula (1): $x=0.50$, $a=0.075$, $b=0.55$.

The luminescent material was prepared according to the firing step as illustrated in connection with Example 1.

The material obtained in this way was subjected to an X-ray diffractometric structural analysis demonstrating that the volume rate occupied by the hexagonal phase was 38%.

EXAMPLE 5

The following substances in the amounts given below were introduced into a porcelain ball mill:

| | |
|---|---|
| 16.5 g | $Y_2O_3$ |
| 4.48 g | $La_2O_3$ |
| 1.83 g | $CeO_2$ |
| 32.1 g | $Al_2O_3$ |
| 0.549 g | $H_3BO_3$ |

The amounts given above determine the following values of the coefficient x and indices a and b in the general structural formula (1): $x=0.688$, $a=0.075$ and $b=0.55$.

The luminescent material was prepared according to the steps disclosed in connection with Example 1.

The material obtained in this way was subjected to an X-ray diffractometric structural analysis demonstrating that the volume rate occupied by the hexagonal phase was 46%.

EXAMPLE 6

The following substances in the amounts given below were introduced into a porcelain ball mill:

| | |
|---|---|
| 16.5 g | $Y_2O_3$ |
| 5.70 g | $La_2O_3$ |
| 2.15 g | $CeO_2$ |
| 37.6 g | $Al_2O_3$ |
| 0.620 g | $H_3BO_3$ |

The amounts given above determine the following values of the coefficient x and indices a and b in the general structural formula (1): $x=0.875$, $a=0.075$ and $b=0.70$.

The luminescent material was prepared according to the steps disclosed in connection with Example 1.

The material obtained in this way was subjected to an X-ray diffractometric structural analysis demonstrating that the volume rate occupied by the hexagonal phase was 52%.

EXAMPLE 7

The following substances in the amounts given below were introduced into a porcelain ball mill:

| | |
|---|---|
| 16.5 g | $Y_2O_3$ |
| 4.07 g | $La_2O_3$ |
| 2.26 g | $CeO_2$ |
| 32.1 g | $Al_2O_3$ |
| 0.550 g | $H_3BO_3$ |

The amounts given above determine the following values of the coefficient x and indices a and b in the general structural formula (1): $x=0.688$, $x=0.075$ and $b=0.50$.

The luminescent material was prepared according to the steps disclosed in connection with Example 1.

The material obtained in this way was subjected to an X-ray diffractometric structural analysis demonstrating that the volume rate occupied by the hexagonal phase was 46%.

EXAMPLE 8

The following substances in the amounts given below were introduced into a porcelain ball mill:

| | |
|---|---|
| 16.5 g | $Y_2O_3$ |
| 2.04 g | $La_2O_3$ |
| 4.41 g | $CeO_2$ |
| 32.1 g | $Al_2O_3$ |
| 0.550 g | $H_3BO_3$ |

The amounts given above determine the following values of the coefficient x and indices a and b in the general structural formula (1): $x=0.688$, $a=0.075$ and $b=0.25$.

The material obtained in this way was subjected to an X-ray diffractometric structural analysis demonstrating that the volume rate occupied by the hexagonal phase was 46%.

EXAMPLE 9

In a homogenizer
10 g luminescent material according to Example 1 and
90 g luminescent material of $YVO_4:Eu^{3+}$ composition were mixed. The resulting blend was applied for preparing a high-pressure mercury vapor gas discharge lamp of 125 W power according to FIG. 5. The outer envelope comprised 950 mg blend. The lamp was prepared according to the general practice of this field of technology.

The high-pressure mercury vapor gas discharge lamp realized according to Example 9 was characterized by light efficiency 54 lm/W, color rendition index $R_a=55$ and color temperature 3300K.

EXAMPLE 10

In a homogenizer a blend of luminescent materials was prepared and homogenized for application in a low-pressure mercury vapor gas discharge lamp. The blend was characterized by compositions A and B and comprised the following parts:
 65% by mass yttrium oxide activated by europium as red component,
 30% by mass cerium magnesium aluminate activated by terbium (according to the DE-A1 2 353 943) or lanthanum phosphate activated by cerium and terbium (according to the U.S. Pat. No. 4,423,349 to Nichia) as green component and
 5% by mass
  A: yttrium aluminate garnet activated by cerium or
  B: luminescent material prepared according to Example 1.

The homogenized blend was applied to a compact luminescent lamp of 9 W power characterized by color temperature 2600K. The light efficiency of the luminescent lamps with blends A and B was respectively:
 A: 60 lm/W and
 B: 61.5 lm/W.

The measurement data given above constitute a clear evidence that due to the better excitability of the two phase blends in comparison to the one phase compositions in the ultraviolet range (at wavelength 254 nm of the mercury line the light efficiency without deteriorating the absorption at 435 nm being necessary for ensuring low color temperature.

The following table illustrates the starting composition of the mixtures given in the Examples, the relative intensity value $I_{rel}$ compared to the yttrium aluminate grenade activated by trivalent cerium, produced by Sylvania under type number 251. The relative intensity was measured for two wavelength value ranges. For comparison a line is added for illustrating the values obtained with a luminescent material not comprising the second phase of hexagonal crystallization system, this luminescent material being prepared and applied in the conditions as stated in connection with the previous Examples. The table, wherein the first number column includes value received under excitation at wavelength about 366 nm and in the full ultraviolet (UV) range of the radiation emitted by a high-pressure mercury vapor gas discharge lamp.

The Example given above refers to a high-pressure mercury vapor gas discharge lamp, but it should be understood that the composition determined—eventually completed with further components—can be applied also to the low-pressure mercury vapor gas discharge lamps and offers the same advantageous parameter values.

Figure 6:
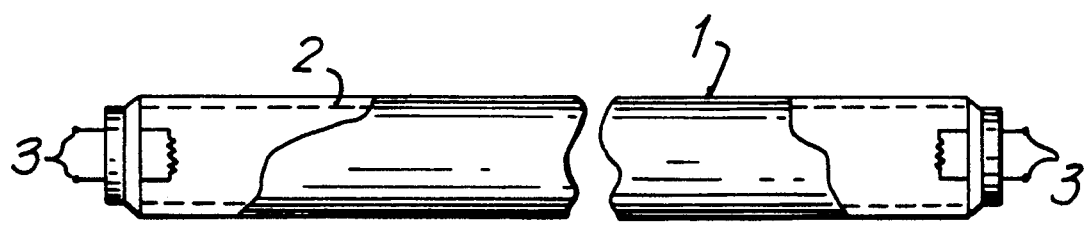
FIG. 6 shows a partial cross sectional view of a low-pressure mercury vapor gas discharge lamp.

FIG. 6 shows a low-pressure mercury vapor gas discharge lamp consisting of a hermetically sealed discharge vessel 1 including at least two electrodes, means 3 for connecting electrodes to an outer voltage supply (not shown), and covered the inner surface with a luminescent material 2.

| Example no. | Composition of the starting raw mixture (without boron acide) | Intensity*, $I_{rel}$ at 366 nm | UV |
|---|---|---|---|
| 1 | $Y_{2.925}La_{0.10}Ce_{0.100}Al_{6.38}O_{14.3}$ | 203 | 135 |
| 2 | $Y_{2.925}La_{0.20}Ce_{0.125}Al_{7.73}O_{16.5}$ | 237 | 137 |
| 3 | $Y_{2.925}La_{0.30}Ce_{0.150}Al_{9.13}O_{18.8}$ | 248 | 141 |
| 4 | $Y_{2.925}La_{0.40}Ce_{0.175}Al_{10.5}O_{21.0}$ | 273 | 132 |
| 5 | $Y_{2.925}La_{0.55}Ce_{0.213}Al_{12.6}O_{24.4}$ | 284 | 129 |
| 6 | $Y_{2.925}La_{0.70}Ce_{0.256}Al_{14.6}O_{27.8}$ | 268 | 114 |
| 7 | $Y_{2.925}La_{0.50}Ce_{0.263}Al_{12.6}O_{24.4}$ | 356 | 155 |
| 8 | $Y_{2.925}La_{0.25}Ce_{0.513}Al_{12.6}O_{24.4}$ | 293 | 155 |
| — | $Y_{2.925}Ce_{0.075}Al_5O_{12}$ | 92 | 96 |

*Relative units, measured with comparison to a standard (luminescent material Sylvania type 251 specified in the last line of the table)

The luminescent material according to the invention comprises in all cases the two phase aluminate system including a grenade and a hexagonal part. From the above description, it should be understood that luminescent materials equivalent to those specified above will be within the scope of the claimed invention, such luminescent materials and mercury vapor gas discharge light sources of any design applying the proposed luminescent material will depend on the given circumstances.

What we claim is:
1. A luminescent material, especially for application in mercury vapor gas discharge light sources, comprising
 a first component for luminescing red light under influence of incident optical radiation and
 a second component for luminescing under influence of said incident optical radiation in the spectral range from 520 to 560 nm including colors from green to yellow, said second component including a first phase of garnet crystallization system consisted of yttrium aluminate activated by trivalent cerium and determined by the general structural formula

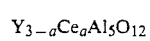

$Y_{3-a}Ce_aAl_5O_{12}$ wherein the value of the index a lies in the range $0.0003 < a < 0.1$, and a second phase of hexagonal crystallization system consisted of a mixed rare earth aluminate of general structural formula $$La_b Ce_{1-b} Al_{11} O_{18}$$

wherein the value of the index b lies in the range $0 < b < 1$, and said second phase is present in an amount ranging from the amounts detectable by means of X-ray diffractometry to the double amount of said first phase.

2. The luminescent material as set forth in claim 1, wherein said second phase is present at most in the amount of the first phase and indices a and b lie in the respective value ranges $0.003 < a < 0.1$ and $0.1 < b < 1$.

3. The luminescent material as set forth in claim 1, wherein in said first phase at most 1% of the cerium atoms is substituted by lanthanum atoms.

4. The luminescent material as set forth in claim 1, wherein said first component is selected from the group consisted of yttrium vanadate and yttrium vanadate phosphate, both being activated by trivalent europium, and said second component consists of said first and second phases, said second component being determined by the general structural formula $$Y_{3-a} Ce_a Al_5 O_{12} + x La_b Ce_{1-b} Al_{11} O_{18}$$

wherein the coefficient x lies in the range $0 < x < 2$.

5. The luminescent material as set forth in claim 4, wherein the coefficient x and the indices a and b lie in the respective value ranges $0 < x < 1$, $0.003 < a < 0.1$ and $0.1 < b < 1$.

6. A low-pressure mercury vapor gas discharge lamp, consisting of a hermetically sealed discharge vessel including at least two electrodes for generating a gas discharge process therebetween in a filling introduced into the inner space of said discharge vessel, said filling comprising mercury as a metal additive and a rare gas, said discharge vessel being equipped with means for connecting said electrodes to an outer voltage supply and covered on the inner surface by a luminescent material, wherein said luminescent material comprises a first component for luminescing red light under influence of incident optical radiation and a second component for luminescing under influence of said incident optical radiation in the spectral range from 520 to 560 nm including colors from green to yellow, said second component including a first phase of garnet crystallization system consisted of yttrium aluminate activated by trivalent cerium and determined by the general structural formula $$Y_{3-a} Ce_a Al_5 O_{12}$$

wherein the value of the index a lies in the range $0.0003 < a < 0.1$, and a second phase of hexagonal crystallization system consisted of a mixed rare earth aluminate of general structural formula $$La_b Ce_{1-b} Al_{11} O_{18}$$

wherein the value of the index b lies in the range $0 < b < 1$, and said second phase is present in an amount ranging from the amounts detectable by means of X-ray diffractometry to the double amount of said first phase.

7. The low-pressure mercury vapor gas discharge lamp as set forth in claim 6, wherein said second phase is present at most in the amount of the first phase and indices a and b lie in the respective value ranges $0.003 < a < 0.1$ and $0.1 < b < 1$.

8. The low-pressure mercury vapor gas discharge lamp as set forth in claim 6, wherein in said first phase at most 1% of the cerium atoms is substituted by lanthanum atoms.

9. A high-pressure mercury vapor gas discharge lamp, comprising of a hermetically sealed outer envelope covered on its inner surface with a layer of a luminescent material, a hermetically sealed discharge vessel arranged within the inner space of said outer envelope and being equipped with at least two electrodes for generating a gas discharge process therebetween in a filling introduced into the inner space of said discharge vessel, said filling comprising mercury as a metal additive and a rare gas, means for energizing said discharge vessel, said means being connectable to an outer voltage supply, wherein said luminescence material comprises a first component for luminescing red light under influence of incident optical radiation and a second component for luminescing under influence of said incident optical radiation in the spectral range from 520 to 560 nm including colors from green to yellow, said second component including a first phase of garnet crystallization system consisted of yttrium aluminate activated by trivalent cerium and determined by the general structural formula $$Y_{3-a} Ce_a Al_5 O_{12}$$

wherein the value of the index a lies in the range $0.0003 < a < 0.1$, and a second phase of hexagonal crystallization system consisted of a mixed rare earth aluminate of general structural formula $$La_b Ce_{1-b} Al_{11} O_{18}$$

wherein the value of the index b lies in the range $0 < b < 1$, and said second phase is present in an amount ranging from the amounts detectable by means of X-ray diffractometry to the double amount of said first phase.

10. The high-pressure mercury vapor gas discharge lamp as set forth in claim 9, wherein said first component of said luminescent material is selected from the group consisted of yttrium vanadate and yttrium vanadate phosphate, both being activated by trivalent europium, and said second component consists of said first and second phases, said second component being determined by the general structural formula $$Y_{3-a} Ce_a Al_5 O_{12} + x La_b Ce_{1-b} Al_{11} O_{18}$$

wherein the value of the coefficient x lies in the range $0 < x < 2$.

11. The high-pressure mercury vapor gas discharge lamp as set forth in claim 10, wherein the coefficient x and the indices a and b lie in the respective value ranges $0<x<1$, $0.003<a<0.1$ and $0.1<b<1$.

12. The high-pressure mercury vapor gas discharge lamp as set forth in claim 9, wherein in said first phase at most 1% of the cerium atoms is substituted by lanthanum atoms.

13. The high-pressure mercury vapor gas discharge lamp as set forth in claim 9, wherein the amount of said second component is in the range 5 to 30% related to the summarized amount of said first and second components.

14. The high-pressure mercury vapor gas discharge lamp as set forth in claim 13, wherein said first component of said luminescent material is selected from the group consisted of yttrium vanadate and yttrium vanadate phosphate, both being activated by trivalent europium.

* * * * *